United States Patent
Vert et al.

(10) Patent No.: US 11,480,730 B2
(45) Date of Patent: Oct. 25, 2022

(54) SILICON PHOTONICS PLATFORM WITH INTEGRATED OXIDE TRENCH EDGE COUPLER STRUCTURE

(71) Applicant: Cisco Technology, Inc., San Jose, CA (US)

(72) Inventors: Alexey V. Vert, Clifton Park, NY (US); Vipulkumar K. Patel, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/304,227

(22) Filed: Jun. 16, 2021

(65) Prior Publication Data

US 2021/0311255 A1 Oct. 7, 2021

Related U.S. Application Data

(63) Continuation of application No. 16/259,998, filed on Jan. 28, 2019, now Pat. No. 11,067,750.

(51) Int. Cl.
*G02B 6/122* (2006.01)
*G02B 6/12* (2006.01)
*G02B 6/136* (2006.01)
*G02B 6/293* (2006.01)
*G02B 6/30* (2006.01)

(52) U.S. Cl.
CPC ....... *G02B 6/1225* (2013.01); *G02B 6/12004* (2013.01); *G02B 6/136* (2013.01); *G02B 6/29332* (2013.01); *G02B 6/305* (2013.01); *G02B 2006/1209* (2013.01); *G02B 2006/1213* (2013.01); *G02B 2006/12061* (2013.01); *G02B 2006/12176* (2013.01)

(58) Field of Classification Search
CPC .. G02B 6/305; G02B 6/1225; G02B 6/29332; G02B 6/136; G02B 6/12004; G02B 6/1223; G02B 6/12002; G02B 2006/12176; G02B 2006/1209; G02B 2006/1213
See application file for complete search history.

(56) References Cited

U.S. PATENT DOCUMENTS 9,128,240 B2* 9/2015 Hatori ............... G02B 6/12
9,618,699 B2* 4/2017 Tummidi ........... G02B 6/107
(Continued)

*Primary Examiner* — Ryan A Lepisto
*Assistant Examiner* — Erin D Chiem
(74) *Attorney, Agent, or Firm* — Patterson + Sheridan, LLP

(57) ABSTRACT

A method includes defining a first waveguide in a first region of an optical device over a first dielectric layer over a silicon on insulator (SOI) substrate of the optical device and disposing a second dielectric layer on the first waveguide and the first dielectric layer of the optical device. The method also includes defining a second region on the second dielectric layer, the first dielectric layer, and the SOI substrate. The second region includes an integrated trench structure defined in the SOI substrate. The method further includes etching the second region to form an etched second region, disposing a third dielectric layer in the etched second region, and disposing a second waveguide on at least the third dielectric layer. The second waveguide is disposed to provide an optical coupling between the second waveguide and the first waveguide.

20 Claims, 9 Drawing Sheets

(56) References Cited

U.S. PATENT DOCUMENTS

2005/0047708 A1* 3/2005 Ma .................... G02B 6/12002
                                                385/14
2018/0039022 A1* 2/2018 Ahn .................... G02B 6/1228
2018/0341065 A1* 11/2018 Chen ................. G02B 6/12002

* cited by examiner

SILICON PHOTONICS PLATFORM WITH INTEGRATED OXIDE TRENCH EDGE COUPLER STRUCTURE

CROSS-REFERENCE TO RELATED APPLICATIONS

This application is a continuation of co-pending U.S. patent application Ser. No. 16/259,998 filed Jan. 28, 2019. The aforementioned related patent application is herein incorporated by reference in its entirety.

TECHNICAL FIELD

Embodiments presented in this disclosure generally relate to a photonic coupler providing a coupling between a light source such as optical fiber or laser and an optical device, such as a photonics chip and/or a silicon-on-insulator (SOI) device. More specifically, embodiments disclosed herein describe a trench region in a photonic coupler which provides spacing between coupling layers in an optical device and a substrate such that the light transmitted in the coupling layers is optically isolated from the substrate.

BACKGROUND

When coupling external light transmitting sources such as an optical fiber or laser to a silicon-on-insulator (SOI) device, precautions must be taken to ensure that the low confined optical mode light signal in the glass based optical fiber is efficiently transmitted to the light carrying mediums such as waveguides in the SOI device without causing optical interference from a substrate of the SOI device. Steps such as wafer bonding are often implemented to provide additional dielectric layers and insulation between the low confined optical mode light signals from the external light source and the silicon substrate. However, wafer bonding increases the size and cost of the SOI devices and also introduces additional production steps into the manufacture of the SOI devices which results in both lower throughput in the production of the devices and lower yield due to increased complexity of the production process.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
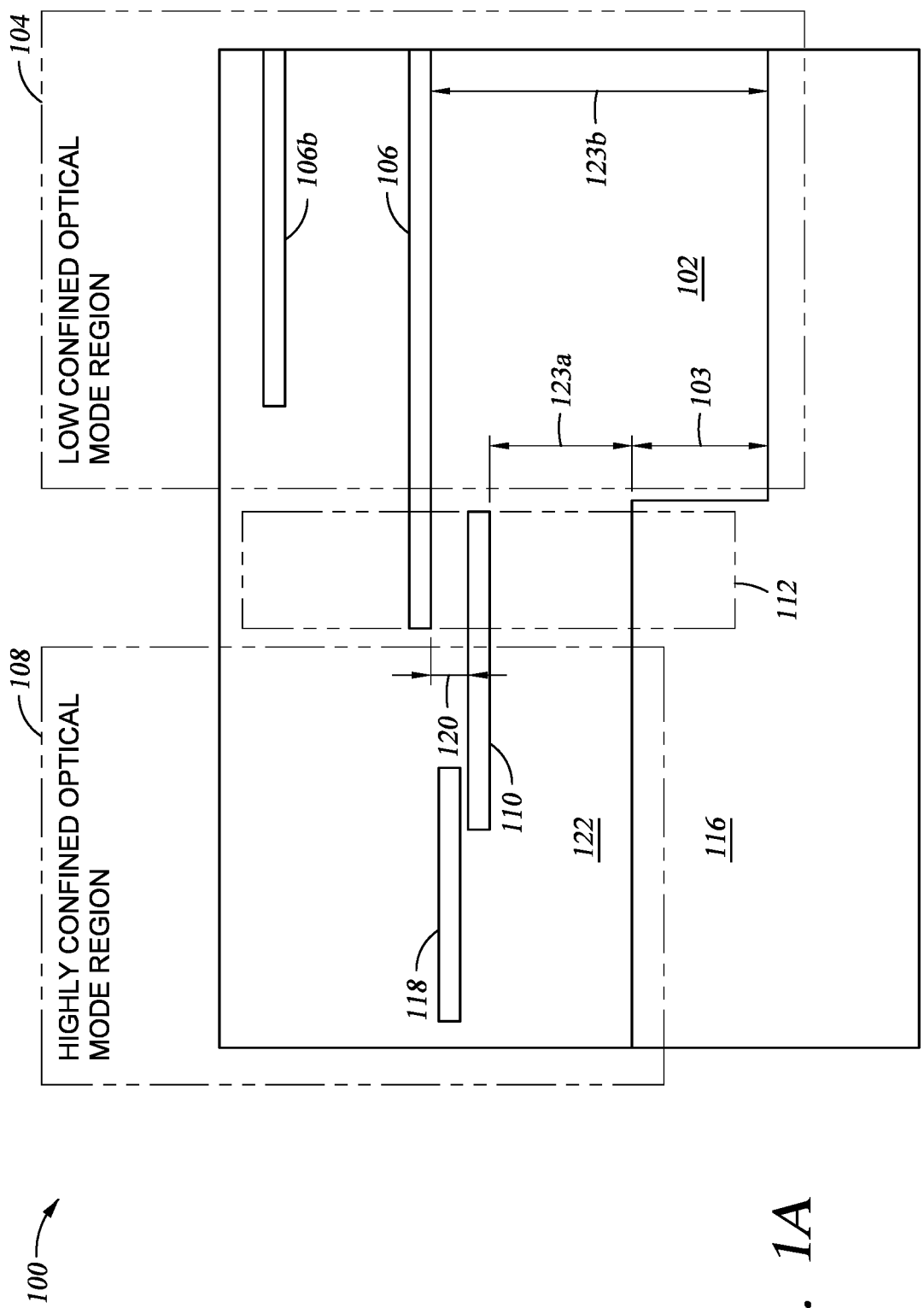
FIG. 1A illustrates a cross-section view of an optical device with an integrated trench, according to one embodiment disclosed herein.

One embodiment presented in this disclosure includes an optical device including: a first optical region including a first waveguide where the first optical region is disposed on a first dielectric layer providing a first distance between the first waveguide and a substrate. The optical device includes a second optical region including a second waveguide where the second optical region is disposed on a second dielectric layer including a trench region in the substrate, where the second dielectric layer provides a second distance between the second waveguide and the substrate. The optical device also includes an optical mode overlap region where the second waveguide is coupled to the first waveguide.

Another embodiment described herein includes a method. The method including disposing a first dielectric layer of a first thickness on a substrate for an optical device and disposing a first waveguide in a first region of the substrate. The method also including disposing a second dielectric layer of a second thickness on first waveguide and the first dielectric layer and defining a second region on the second dielectric layer, the first dielectric layer, and the substrate, where the second region includes an integrated trench structure defined in the substrate, where a thickness of the integrated trench structure provides a third thickness between a bottom portion of the trench structure and a top portion of the second dielectric layer. The method further including etching the second region, disposing a third dielectric layer in the etched second region, and disposing a second waveguide on at least the third dielectric layer, where the second waveguide is disposed to provide an optical coupler between the second waveguide and the first waveguide.

Another embodiment described herein includes a substrate. The substrate includes a first optical region including a first waveguide where the first optical region is disposed on a first dielectric layer disposed on the substrate, where the first dielectric layer provides a first distance between the first waveguide and the substrate. The substrate also includes a second optical region including a second waveguide where the second optical region is disposed on a second dielectric layer disposed on the substrate, where the second optical region includes a trench region in the substrate, and where the second dielectric layer provides a second distance between the second waveguide and the substrate. The substrate also includes an optical mode overlap region where the second waveguide is coupled to the first waveguide.

Example Embodiments

As described above, optical devices, such as SOI devices, directly coupled to external light sources, such as optical fibers and lasers, include dielectric layers between silicon photonic components (e.g., waveguides) and other silicon components of the optical devices (e.g., the substrate). The dielectric layers ensure that the silicon photonic components are optically isolated from the other silicon components of the optical devices. For example, the separation provided by the dielectric layers provides isolation to photonic components of the optical device from light signals leaking from various waveguides. For waveguides carrying highly-confined optical mode light signals, the dielectric layer can be relatively thinner (e.g., 0.5-2 microns (μm) between the highly-confined waveguides and the substrate) since the highly-confined light signals propagating through the waveguide are less susceptible to optical interference and are less likely to leak light. In some examples, a highly confined waveguide region includes a silicon single mode waveguide surrounded by silicon dioxide cladding layers, where the refractive index difference between silicon and oxide regions is relatively high. In some examples, a region, where a waveguide is defined with silicon nitride material and is surrounded by silicon dioxide cladding layers is considered a low optically confined region. The low optically confined region can include silicon nitride features (waveguides) with dimensions that are small enough to support fundamental optical mode propagation. However for such low optically confined regions and for waveguides carrying low confined optical mode light signals, (e.g., waveguides coupled to a low confined light source such as an external optical fiber or laser), the dielectric layer is relatively thicker (e.g., at least 3-4 μm between the low confined waveguides and the substrate).

Current solutions to provide the optical isolation between waveguides and the substrate of optical devices require additional steps of wafer bonding of the optical devices. The wafer bonding provides the extra distance in the dielectric layers between the low confined waveguides and the substrate of the optical device. These additional wafer bonding steps increase the manufacturing cost and complexity. For example, wafer bonding requires both wafer bonding and wafer grinding steps before an optical device is ready for use. Additionally, the resulting optical devices are larger and inefficiently constructed since they require thicker dielectric layers needed in the optical device. For example, while the density of and/or the space occupied by the photonic elements and waveguides in the optical devices is very small, the optical isolation requirements for photonic elements require the optical device to be positioned at a greater distance from other elements and to provide for the additional dielectric layers.

In some examples, the larger devices also increase SOI stress management requirements, meaning the larger devices are more likely to warp or bow when layers are removed during the wafer bonding processes. This can cause misalignment in the optical devices and ultimately render the optical devices unusable. The large optical devices and complex manufacturing process results in slower production throughput and increased likelihood of yield loss in the production cycle.

The optical devices and methods described herein provide an optical device with an integrated trench in the substrate of the optical device. The integrated trench provides a thicker dielectric layer for the low confined waveguides coupled to a low confined light source without any additional wafer bonding processes and without overly-thick dielectric layers over highly-confined photonic components. For example, the integrated trench described herein may use less than 1% of the total chip area of the optical device thus greatly reducing the use of additional dielectric material. In some examples, the systems and methods described herein enable low loss silicon-nitride (SiN) based coupling and optical mode matching directly to the optical device from an external light source. In some examples, the SiN based coupling described herein also provides for low confined and highly confined modes in the silicon photonic components in the same plane with an external light source, such as connected optical fibers. Additionally, the smaller optical devices with the integrated trench, described herein, also decrease the stress management concerns from the previous approaches and also reduce the production complexity of the optical devices as compared to previous approaches.

Figure 1B:
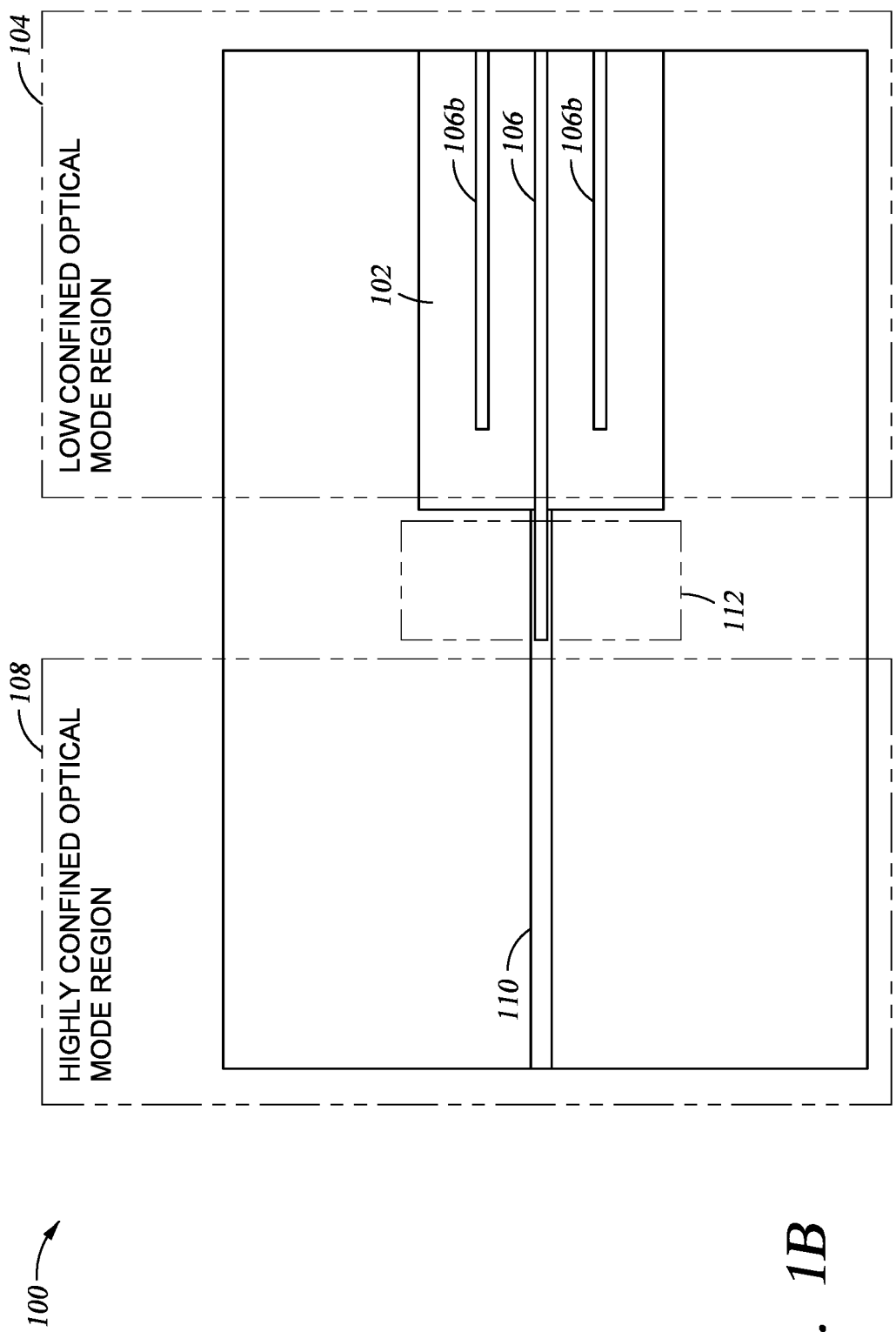
FIG. 1B illustrates a top view of an optical device with an integrated trench, according to one embodiment disclosed herein.

FIGS. 1A and 1B illustrates an optical device with an integrated trench, according to one embodiment disclosed herein. FIG. 1A illustrates a side cross-section view of the optical device 100. In some examples, the optical device 100 includes photonic devices such as optical waveguides, modulators, photodetectors, lasers, etc. In some examples, the optical device 100 also includes electrical devices electrical devices such as transistors, resistors, capacitors, inductors, transmission lines, etc. As described herein, an integrated trench 102 provides the dielectric layers for a low confined optical mode waveguide such as the waveguide 106. As shown, optical device 100 includes a low confined optical mode region, region 104, a highly confined optical mode region, region 108, and an optical mode overlap region 112. In some examples, the region 104 includes an external coupling region as further described in relation to FIGS. 2A-3B. For example, the region 104 may provide for a direct coupling from an optical fiber to the side-wall of the optical device 100. In another example, the region 104 is a component region in the optical device not related to an external coupling, but includes a low confined optical mode region. For example, the optical device 100 may comprise an optical splitter, an optical waveguide transition zone, and/or a tap coupler device.

Optical device 100 also includes a substrate 116 (e.g., a silicon on insulator (SOI) substrate) on which the regions 104, 108 and 112 are disposed and a dielectric buried oxide (BOX) layer 122. As described above and shown in FIG. 1A, the BOX layer includes a first distance, distance 123a, in the region 108 and a second distance, distance 123b, in the region 104. The distance 123a provides optical isolation between a waveguide 110 and other photonic components in the region 108 and the substrate 116 in order to preserve the optical signal carried in the highly confined waveguide 110 and to prevent electrical interference from light signals in the substrate 116. In some examples, the distance 123a is at least 0.5-2 μm.

Similarly, the distance 123b provides optical isolation between a waveguide 106 other photonic components in the region 104 and the substrate 116. In some examples, the distance 123b is at least 3-4 μm. As shown in FIG. 1A, the distance 123a is less than the distance 123b since the waveguide 110 is a highly confined waveguide and will experience and/or cause less optical interferences from a substrate as compared to the low confined waveguide 106. In order to provide the distance needed for the distance 123b the optical device 100 includes the trench 102 in the region 104. The trench provides the distance 123b in the dielectric layers without increasing the distance 120, creating a sloped coupling waveguide in the region 104, and/or creating a bonded wafer. As shown, the integrated trench 102 has a depth 103 into the substrate 116 in order to provide the distances between the substrate and the waveguide 106 and other photonics components in the region 104. In some examples, low optical confinement regions use larger separation between a waveguide and a substrate. For example, distance 123a and depth 103 shown in FIG. 1A includes a distance of at least 3 to 4 μm. In some examples, the depth of integrated trench is determined by fabrication process capabilities and expected manufacturing yield of the fabrication process as well as a structural integrity of the wafer when trench material is removed and before filling it with dielectric material. The photonic components of the regions 104, 108, and 112 provide a light transmission path for optical signal.

For example, as shown in both FIGS. 1A and 1B, the regions 104, 108, and 112 include photonic components such as waveguides that provide a light transmission path and guide optical signals through the optical device 100. Regions 104 and 112 include the waveguide 106 which has a low confined optical mode. In some examples, the region 104 may include multiple waveguides, such as waveguide 106 and multiple other waveguides which collectively form components of a coupler 106b. The regions 108 and 112 include the waveguide 110, which is coupled to waveguide 118. In some examples, the waveguide 118 carries an optical signal to/from waveguide 110 to optical processing components (OPC) (not shown in FIG. 1A) of the optical device 100. The waveguide 110 is in turn coupled to the waveguide 106 in the region 112.

For example, the waveguide 106 (and/or the coupler 106b) and the waveguide 110 are coupled in the optical mode overlap region 112, such that an optical signal can transfer to/from the waveguide 110 and the waveguide 106. FIG. 1B illustrates a top view of the optical device 100 described in relation to FIG. 1A. As shown in FIG. 1B, the waveguide 106 overlaps the waveguide 110 in the optical mode overlap region 112 in order to provide a path for optical signals to pass between the waveguide 110 and the waveguide 106 (and/or in some examples the coupler 106b). In some example, the waveguide 110 is a silicon (Si) waveguide. In some examples, the coupler 106b includes one or more of a SiN-prong coupler, a SiN-nanotaper couple, and/or another type of SiN-base coupler and/or adapter as found in U.S. patent application Ser. No. 14/658, 220 entitled "MULTILAYER PHOTONIC ADAPTER" and U.S. patent application Ser. No. U.S. Ser. No. 13/935,277 which are herein incorporated by reference. In some examples, the coupler 106b also includes one or more poly-silicon or amorphous-silicon waveguides.

Returning to FIG. 1A, the waveguide 106 directly overlaps the waveguide 110 at a distance 120. In some examples, distance 120 is a small distance in order to ensure efficient transfer of optical signals between the waveguides 110 and 106 via the direct overlap. Typical distance between two waveguides can be in the range 100 nm and 1000 nm in order to ensure efficient coupling of the waveguides. The direct overlap of the waveguides 106 and 110 is described in more detail in relation to FIGS. 2A-B below. In some examples, the optical mode overlap region 112 may include one or more additional intermediate or coupling waveguides between the waveguides 106 and 110, as described herein in relation to FIGS. 3A and 3B.

Figure 2A:
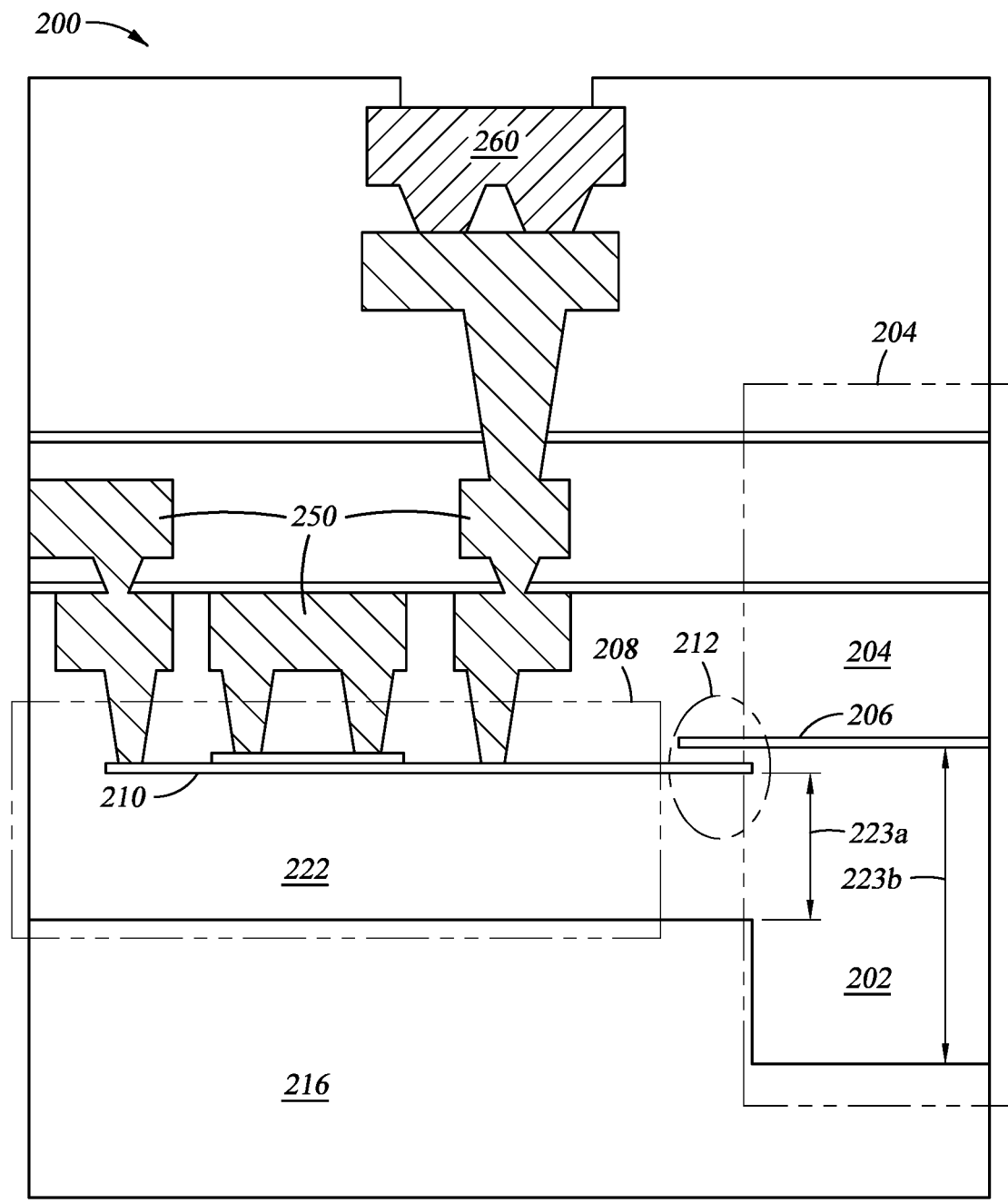
FIG. 2A illustrates a cross-section view of an optical device with an integrated trench, according to one embodiment disclosed herein.
Figure 2B:
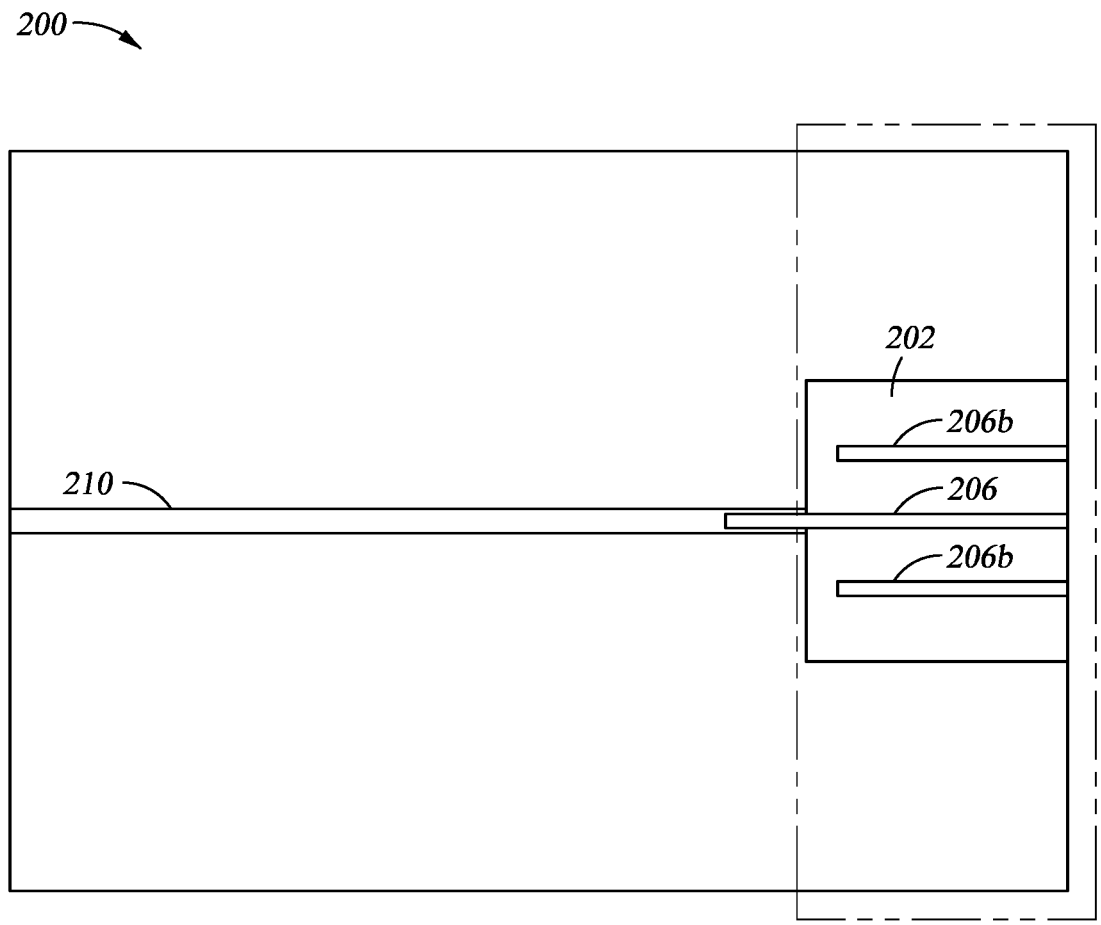
FIG. 2B illustrates a top view of an optical device with an integrated trench, according to one embodiment disclosed herein.

FIGS. 2A and 2B illustrates an optical device with an integrated trench, according to one embodiment disclosed herein. FIG. 2A illustrates a side cross-section view of the optical device 200, with an integrated trench 202 and a direct optical mode overlap region 212. As shown, optical device 200 includes a low confined optical mode region, region 204, and a highly confined optical mode region, region 208, where a waveguide 206 overlaps a waveguide 210 in the region 212.

As shown, both regions 204 and 208 include photonic components such as waveguides that guide optical signals through the optical device 200. Region 204 includes a waveguide 206 (a component of the coupler 206b) which has a low confined optical mode. As further shown in FIG. 2A, the region 208 includes waveguide 210 connected to the components 250 (and one or more additional waveguides). The waveguide 206 and the waveguide 210 are coupled by an overlap shown in overlap region 212. As shown, the waveguide 206 and the waveguide 210 are coupled directly without an additional intermediate waveguide. In some examples, the coupling in the overlap region 212 is a direct SiN-Si coupling. In some examples, optical coupling in this example is achieved by inversely tapered waveguides with the a length of the transition region in the range between 100 nm and 1000 μm. FIG. 2B illustrates a top view of the optical device 200 with the integrated trench 202 described in relation to FIG. 2A. As shown in FIG. 2B, the waveguide 206 overlaps the waveguide 210 to provide for optical signals to pass between the waveguide 210 and the waveguide 206 and providing a light transmission path from the coupler 206b to the optical device 200 including the OPC 260.

Returning to FIG. 2A, the optical device 200 also includes a substrate 216 and a BOX layer 222. The BOX layer includes a first distance, distance 223a, and a second distance, distance 223b. The distance 223a provides electric insulation for the waveguide 210 and the distance 223b provides electric insulation for the waveguide 206. FIG. 2A also shows additional photonic processing components such as components 250, including metallic components, vias, etc., which provide a transmission path from the waveguide 210 to the OPC 260 of the optical device 200. The components 250 may be situated in the BOX layer 222 among other regions of the optical device 200.

In some examples, the region 204 is an external coupling region such as an edge coupler including a prong edge coupler and/or a nanotaper coupler, where the region 204 is coupled to an external light source such as an optical fiber or a laser. For example, the region 204 may provide for a direct coupling from an optical fiber to the side-wall of the optical device 200. For example, the coupler 206b may include one or more of a SiN-prong coupler, an SiN-nanotaper coupler, and/or another type of SiN-based coupler.

Figure 3A:
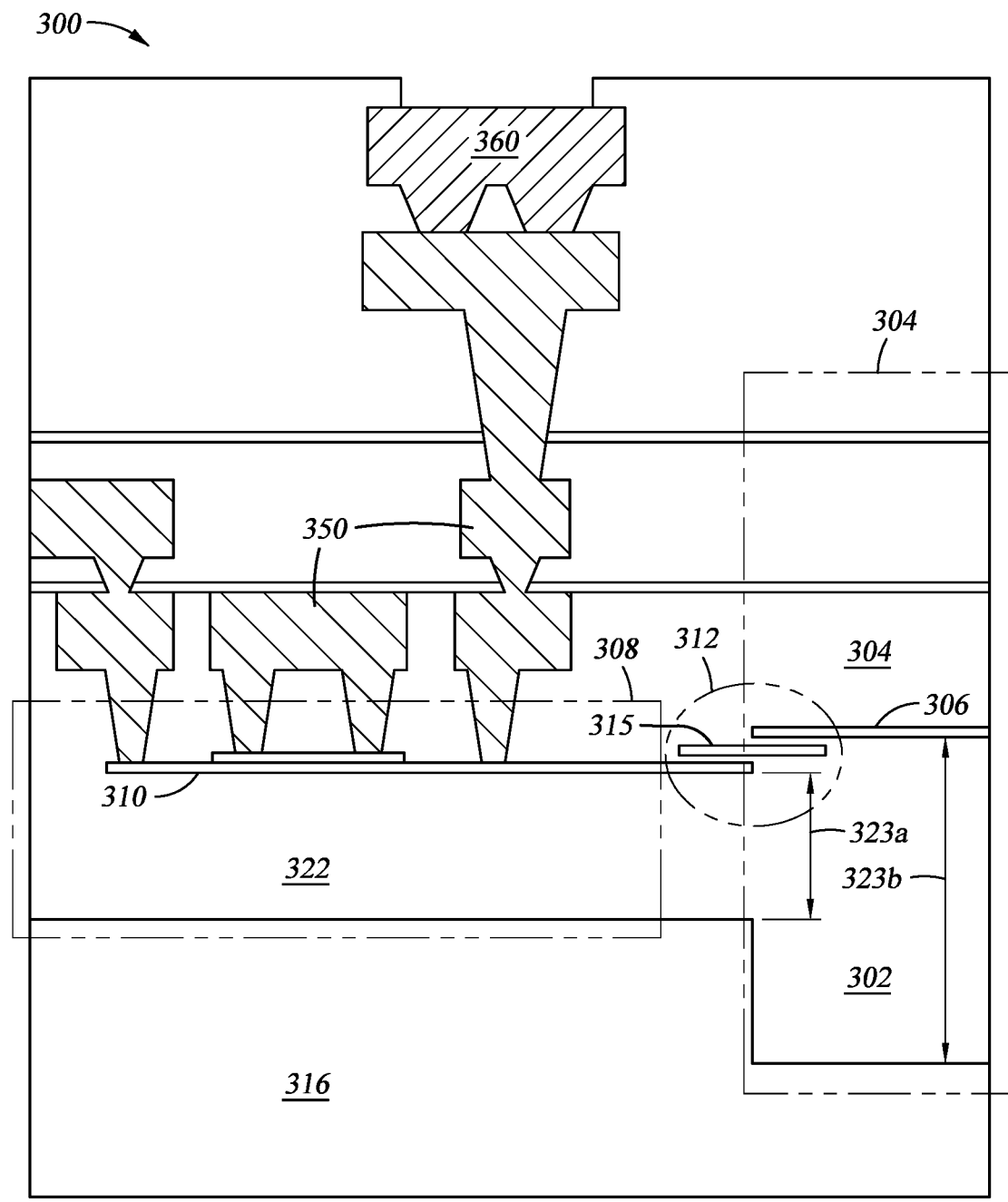
FIG. 3A illustrates a cross-section view of an additional optical device with an integrated trench, according to one embodiment disclosed herein.
Figure 3B:
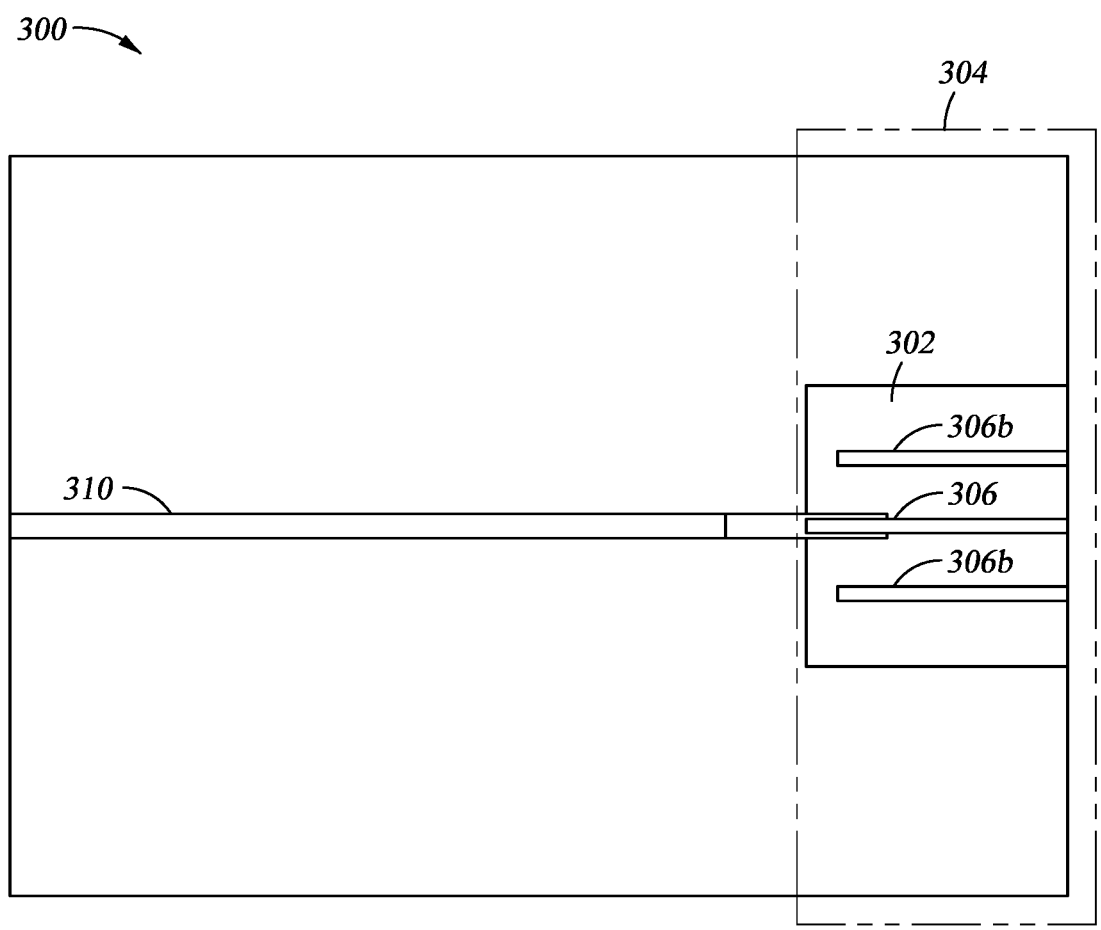
FIG. 3B illustrates a top view of an additional optical device with an integrated trench, according to one embodiment disclosed herein.

FIGS. 3A and 3B illustrates an optical device with an integrated trench, according to one embodiment disclosed herein. FIG. 3A illustrates a side cross-section view of the optical device 300, with an integrated trench 302 and an intermediate overlap region 312. As shown, optical device 300 includes a low confined optical mode region, region 304, and a highly confined optical mode region, region 308, and the overlap region 312 where a waveguide 306 overlaps an intermediate waveguide 315 which in turn overlaps the waveguide 310.

For example, as shown in the overlap region 312, the waveguide 306 and the waveguide 310 are coupled with the intermediate waveguide 315. In some examples, the waveguide 310 is a Silicon (Si) waveguide and the intermediate waveguide 315 (coupling waveguide) and the waveguide 306 are SiN waveguides, silicon oxynitride waveguides, poly-silicon (PolySi) waveguides and/or amorphous-silicon waveguides. Optical coupling in this example is achieved by inversely tapered waveguides with the typical length of the transition region in the range between 100 nm and 1000 μm. In some examples, the coupling in the overlap region 312 is a SiN-PolySi—Si coupling. In some examples, the additional intermediate coupling waveguide allows for lower transmission loss between the SiN and the Si coupling. FIG. 3B illustrates a top view of the optical device 300 described in relation to FIG. 3A. As shown in FIG. 3B, the waveguide 306 overlaps the intermediate waveguide 315 which in turn overlaps the waveguide 310 to provide for optical signals to pass between the waveguide 310 and the waveguide 306 and provides a light transmission path from the coupler 306b to the optical device 300 including the OPC 360.

The optical device 300 also includes a substrate 316 and a BOX layer 322. The BOX layer includes a first distance, distance 323a, and a second distance, distance 323b. The distance 323a provides electric insulation for the waveguide 310 and the distance 323b provides electric insulation for the waveguide 306. As shown, both regions 304 and 308 include photonic components such as waveguides that guide optical signal through the optical device 300. FIG. 3A also shows additional photonic components such as components 350 which provide a light transmission path from the waveguide 310 to the OPC 360 of the optical device 300. Region 304 includes a waveguide 306 (a component of the coupler 306b) which has a low optical mode. As further shown in FIG. 3A, the region 308 includes a waveguide 310 connected to the components 350 (and one or more additional waveguides).

In some examples, the region 304 is an external coupling region such as an edge coupler including a prong edge coupler and/or a nanotaper coupler, etc. For example, the region 304 may provide for a direct coupling from an optical fiber to the side-wall of the optical device 300. For example, the coupler 306b may include one or more of a SiN-prong coupler, a SiN-nanotaper coupler, and/or another type of SiN-based coupler to connect an optical fiber to the optical device 300.

Figure 4A:
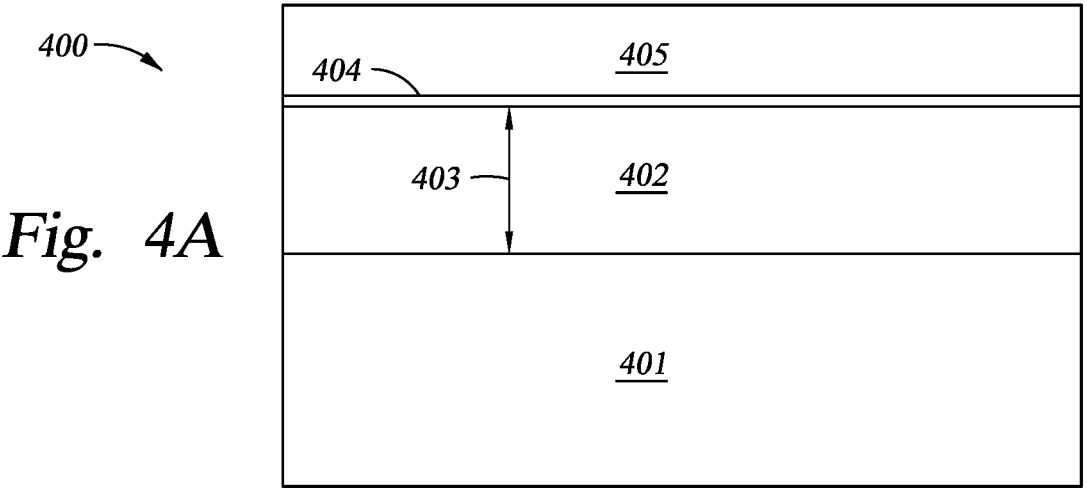
FIGS. 4A-4C illustrates an example production process for an optical device with an integrated trench, according to one embodiment disclosed herein.
Figure 4B:
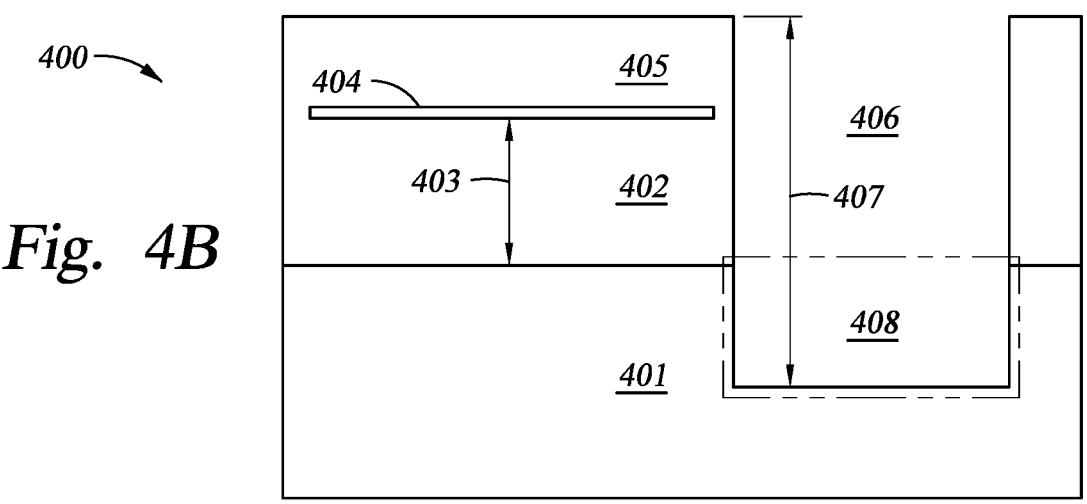
Figure 4C:
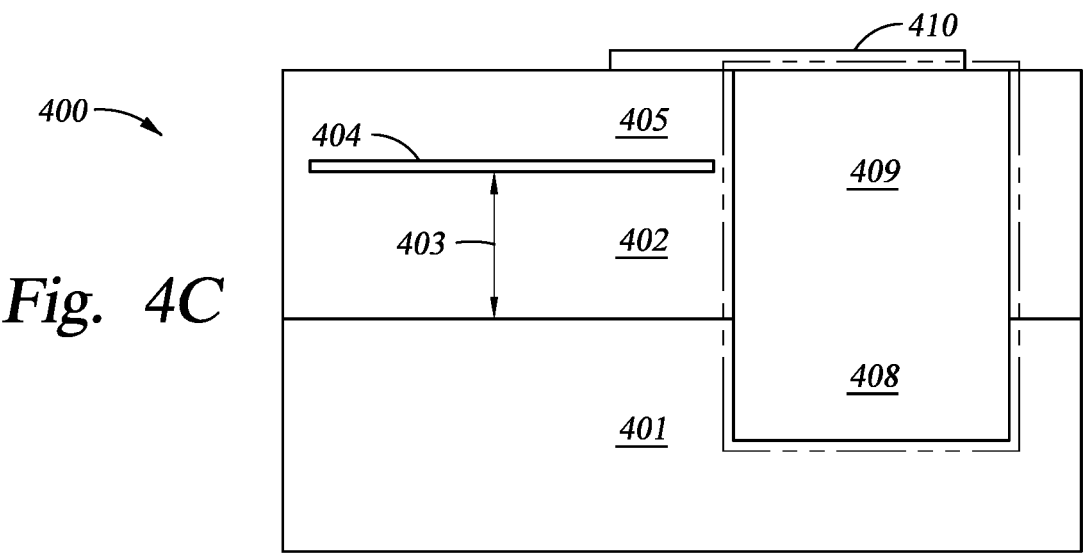

The optical device 100 described in FIGS. 1A-B, the optical device 200 described in FIGS. 2A-B, and the optical device 300 described in FIGS. 3A-B, may all be produced using similar processes such as the processes described in relation to FIGS. 4A-C.

FIGS. 4A-4C illustrates an example production process for an optical device with an integrated trench, according to one embodiment disclosed herein. Reference will be made to previous figures. As shown in FIG. 4A, a substrate 401 is provided for an optical device such as an SOI device and/or any of the optical devices 100, 200, and 300. A first dielectric layer 402 is deposited on the substrate 401. In some examples, the first dielectric layer has a thickness 403 which provides insulation between the substrate 401 and a waveguide 404 which is deposited on the first dielectric layer 402. In some examples, the waveguide 404 is a Si waveguide. In some examples, multiple waveguides 404 may be deposited on the first dielectric layer 402. For examples, as described in relation to FIG. 1A, both waveguide 110 and waveguide 118 may be deposited on the first dielectric layer 402.

A second dielectric layer 405 is deposited on the first dielectric layer 402 and/or the waveguide(s) 404. In some examples, the second dielectric layer 405 is a deposited oxide layer. In some examples, the waveguide(s) 404 are intermediately deposited in the second dielectric layer 405. For example, as shown in FIG. 1A, the waveguides 110 and 118 may be deposited at differing levels in the second dielectric layer 405.

In FIG. 4B, a region 406 is defined in the components of the optical device 400. In some examples, the size of the trench area is defined by the size of the coupler area containing low confined optical mode region and is intended to at least partially include it within the trench region. In some examples, the trench region may extend outside of the size of the low optical confinement area of the coupler to reduce interference from the substrate. The defined region 406 includes the integrated trench 408 in the substrate 401. As shown in FIG. 4B, the region 406 is removed from the components of the optical device 400, leaving the trench 408. In some examples, the region 406 is removed using an etching process to create an etched region trench such as the trench 408. An example of the etch process is a reactive ion etching process of a dielectric and silicon layers standard for semiconductors manufacturing. In some examples, the region 406 is defined by a thickness 407, where the thickness 407 provides for optical isolation between a low confined mode photonic component (waveguide) deposited above the second dielectric layer 405 and the substrate 401.

In FIG. 4C, a third dielectric layer 409 is deposited in the trench 408 and the other removed portions of region 406. The one or more low confined mode waveguides, waveguides(s) 410, are then deposited on the third dielectric layer 409 and/or the second dielectric layer 405. In some examples, the waveguide(s) 410 overlap the waveguide(s) 404 to provide a coupling region between the low confined optical mode waveguide and the highly-confined optical mode waveguides. In some examples, an intermediate waveguide, such as the intermediate waveguide 315 described in relation to FIGS. 3A and 3B, is deposited between the waveguide(s) 404 an the waveguide(s) 410.

Figure 5:
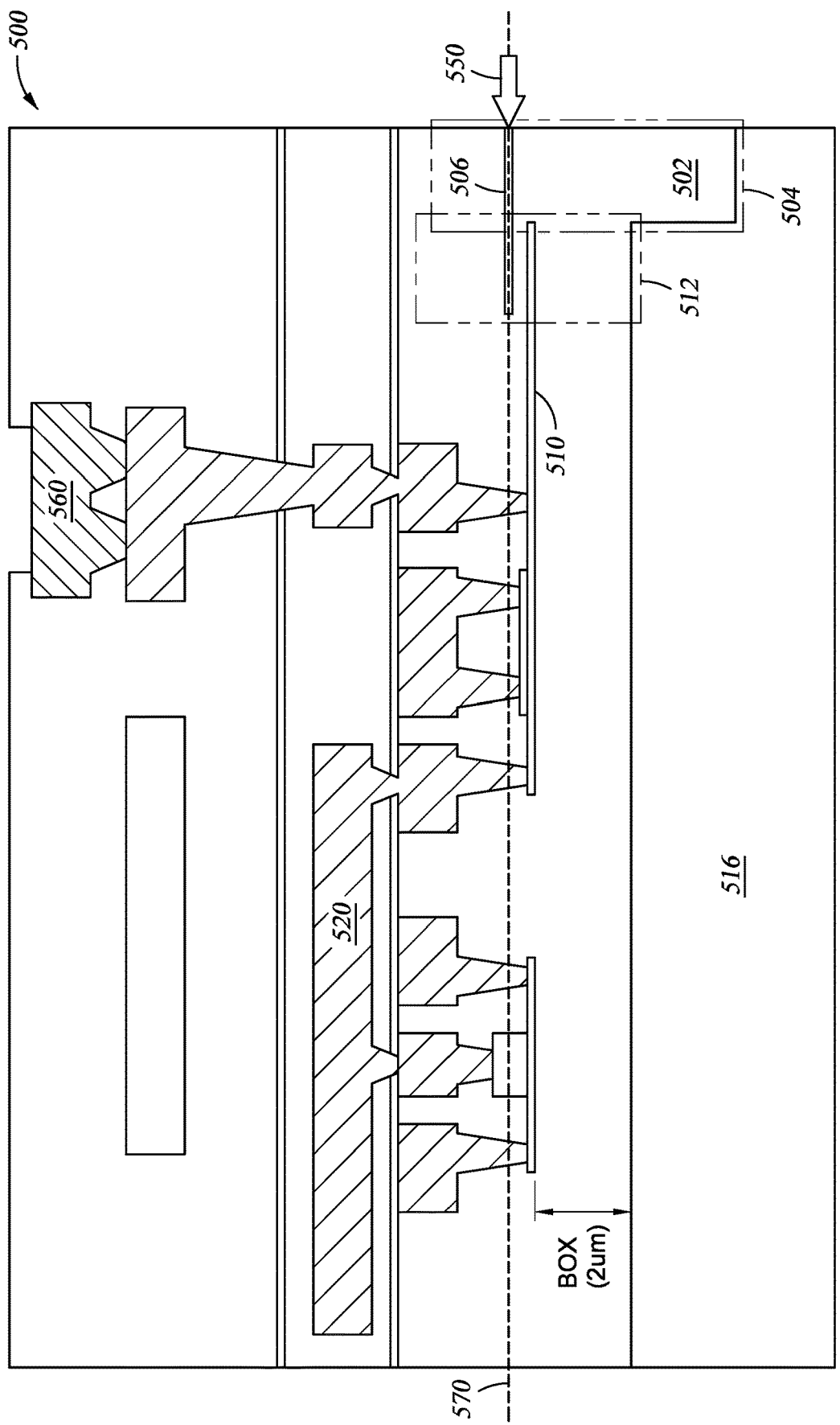
FIG. 5 illustrates a cross-section view of an optical device with an integrated trench providing a planar coupler to an external light source, according to one embodiment disclosed herein.

FIG. 5 illustrates a cross-section view of an optical device with an integrated trench providing an in-plane (coplanar) optical coupling or planar coupling to an external light source, according to one embodiment disclosed herein. For example, the optical device 500 includes an external optical coupler in the region 504, including the trench 502 in the substrate 516. The external optical coupler provides a light transmission path for the light 550, which comes from a light source such as an optical fiber, a laser, or another optical device such as an optical chip, polymer waveguide structure, etc. As shown, the light transmission path of at least the waveguides 506 and 510 is coplanar on the plane 570 with the light 550. The light 550 is then transmitted via the waveguides 506 and 510, which are coupled in the coupling region 512 to the photonic components 520 and the OPC 560 of the optical device 500. As shown, the coplanar nature of the edge couples increases the light transmission efficiency of the waveguides and reduces the production complexity of the optical device 500. The coplanar coupling described herein may include a coplanar edge coupling (butt-coupling) and/or a coplanar evanescent coupling.

Figure 6:
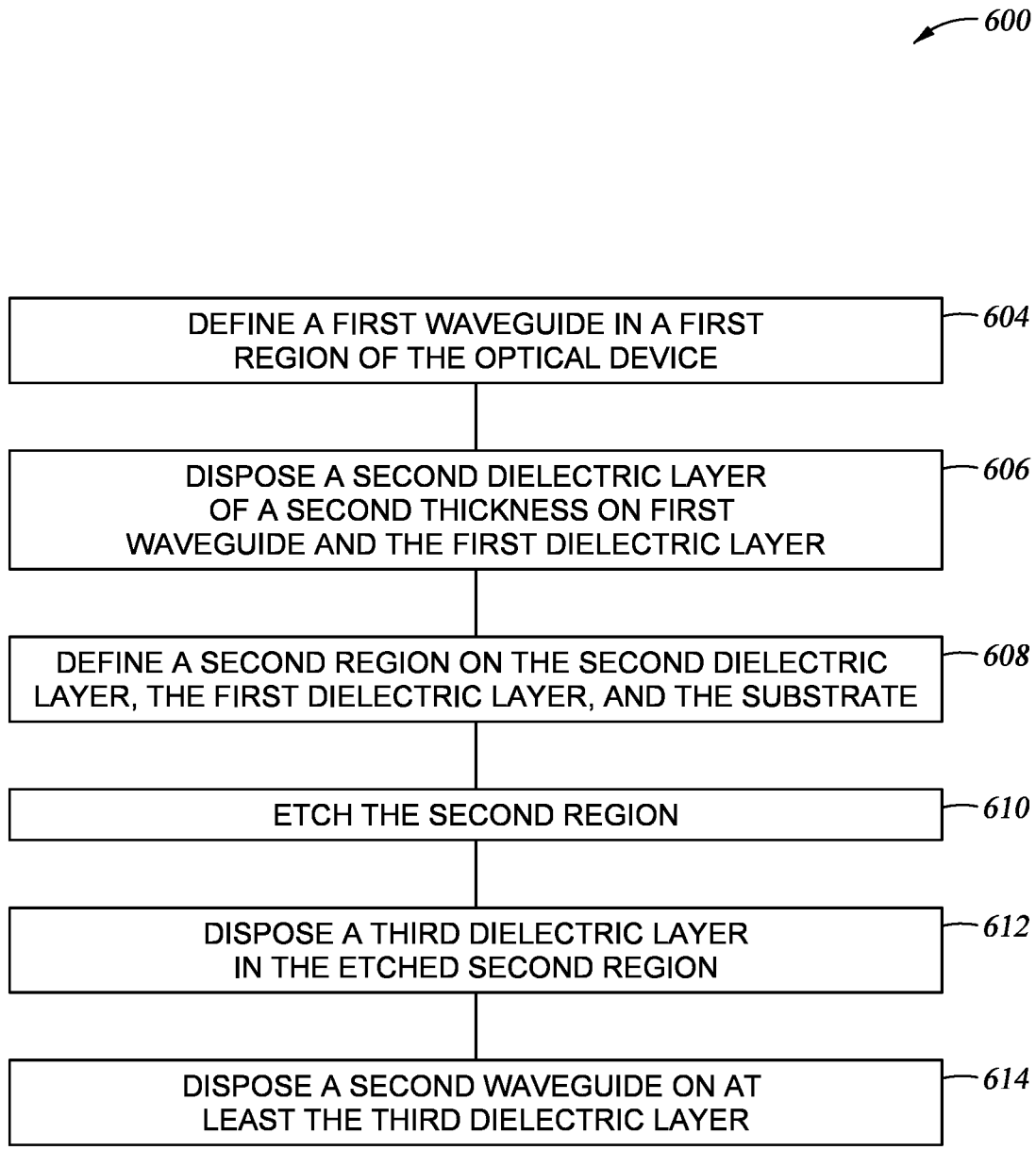
FIG. 6 is a flowchart illustrating operations of an example method for the production of an optical device with an integrated trench, according to one embodiment disclosed herein.

FIG. 6 is a flowchart illustrating operations of an example method for the production of an optical device with an integrated trench, according to one embodiment disclosed herein. Method 600 begins at block 604 where a first waveguide is defined in a first region of the optical device. For example, the waveguide(s) 404 are formed on the SOI dielectric layer in a first region, such as region 108 described in relation to FIGS. 1A and B. In some examples, the first waveguide is a highly-confined optical mode waveguide. In some examples, the first waveguide is a silicon waveguide. In some examples, the optical device includes a substrate (e.g., substrate 401) for the optical device and a first BOX layer (e.g., first dielectric layer 402) with a first thickness (e.g., thickness 403).

At block 606, a second dielectric layer of a second thickness is disposed on the first waveguide and the first dielectric layer. For example, the second dielectric layer 405 is deposited on the waveguide(s) 404 and the first dielectric layer 402. In some examples, the second dielectric layer 405 is deposited oxide layer.

At block 608, a second region is defined on the second dielectric layer, the first dielectric layer, and the substrate. In some examples, the second region includes an integrated trench structure such as trench 408 defined in the substrate 401. Additionally, a thickness of the integrated trench structure provides a third thickness such as thickness 407 between a bottom portion of the trench structure and a top portion of the second dielectric layer. At block 610, the second region is etched away from the other components. For example, the region 406 is etched away from the surrounding components of optical device 400.

At block 612, a third dielectric layer is disposed in the etched second region and at block 614; a second waveguide is disposed on at least the third dielectric layer. In some examples, the second waveguide is a low confined mode waveguide. In some examples, the second waveguide is disposed to provide an optical coupling between the second waveguide and the first waveguide. For example, the third dielectric layer 409 is deposited on in the region 406 and the waveguide(s) 410 is deposited on the second dielectric layer 405 and/or the third dielectric layer 409.

In some examples, prior to disposing the second waveguide, a third waveguide is disposed on at least the third dielectric layer and the second dielectric layer. The third waveguide is disposed to overlap a portion of the first waveguide and the second waveguide is disposed to overlap a portion of the third waveguide. In this example, the third waveguide provides an optical coupling between the second waveguide and the third waveguide, as described in relation to FIGS. 3A and B. In some examples, additional processing steps are performed to complete the optical device, such as adding additional photonic and electric components to create any or all of the optical devices 100, 200, 300, and 500 as described herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
 defining a first waveguide in a first region of an optical device over a first dielectric layer over a silicon on insulator (SOI) substrate of the optical device;
 disposing a second dielectric layer on the first waveguide and the first dielectric layer of the optical device;
 defining a second region on the second dielectric layer, the first dielectric layer, and the SOI substrate, wherein the second region includes an integrated trench structure defined in the SOI substrate;
 etching the second region to form an etched second region;
 disposing a third dielectric layer in the etched second region; and
 disposing a second waveguide on at least the third dielectric layer, wherein the second waveguide is disposed to provide an optical coupling between the second waveguide and the first waveguide.

2. The method of claim 1, wherein the first waveguide comprises a highly-confined optical mode waveguide and the second waveguide comprises a low confined mode waveguide.

3. The method of claim 1, wherein a first distance between the first waveguide and a portion of the SOI substrate in the first region is less than a second distance between the second waveguide and a bottom portion of the integrated trench structure.

4. The method of claim 1, further comprising, prior to disposing the second waveguide, disposing a third waveguide on at least the third dielectric layer and the second dielectric layer, wherein the third waveguide is disposed to overlap a portion of the first waveguide and wherein the second waveguide overlaps a portion of the third waveguide, wherein the third waveguide provides an optical coupling between the second waveguide and the third waveguide.

5. The method of claim 4, wherein the third waveguide provides an optical coupling between the third waveguide and the first waveguide.

6. The method of claim 4, wherein a first distance between the first waveguide and a first portion of the SOI substrate in the first region is less than (1) a second distance between the second waveguide and a bottom portion of the integrated trench structure and (2) a third distance between the third waveguide and the first portion of the SOI substrate.

7. The method of claim 6, wherein the second distance is greater than a fourth distance between the third waveguide and the bottom portion of the integrated trench structure.

8. The method of claim 1, wherein first dielectric layer comprises a buried oxide layer and second and third dielectric layers comprise a deposited oxide layer.

9. The method of claim 1, wherein the second waveguide comprises at least a portion of an optical coupler, wherein the optical coupler provides a light transmission path from an optical fiber or a laser to the optical device.

10. The method of claim 9, wherein the optical coupler provides a planar coupling to an optical fiber, a laser, or another optical device.

11. The method of claim 1, wherein the first waveguide comprises a Silicon waveguide and wherein the second waveguide comprises a Silicon Nitride or a Silicon Oxynitride waveguide.

12. The method of claim 1, wherein the first waveguide comprises a silicon waveguide and wherein the second waveguide comprises a silicon nitride, a silicon oxynitride, poly-silicon, or amorphous-silicon waveguide.

13. The method of claim 1, wherein the second waveguide comprises an optical coupler for coupling to an external light source.

14. The method of claim 1, wherein the second waveguide is configured to propagate a signal from an optical light source to the first waveguide.

15. A method comprising:
    disposing a first waveguide over a first dielectric layer over a SOI substrate;
    disposing a second dielectric layer on the first waveguide and the first dielectric layer;
    etching the second dielectric layer, the first dielectric layer, and the SOI substrate to form an integrated trench structure in the SOI substrate;
    disposing a third dielectric layer in the integrated trench structure; and
    disposing a second waveguide on at least the third dielectric layer such that the second waveguide provides an optical coupling between the second waveguide and the first waveguide.

16. The method of claim 15, wherein the first waveguide comprises a highly-confined optical mode waveguide and the second waveguide comprises a low confined mode waveguide.

17. The method of claim 15, further comprising, prior to disposing the second waveguide, disposing a third waveguide on at least the third dielectric layer and the second dielectric layer, wherein the third waveguide is disposed to overlap a portion of the first waveguide and wherein the second waveguide overlaps a portion of the third waveguide, wherein the third waveguide provides an optical coupling between the second waveguide and the third waveguide.

18. The method of claim 15, wherein first dielectric layer comprises a buried oxide layer and second and third dielectric layers comprise a deposited oxide layer.

19. The method of claim 15, wherein the second waveguide comprises at least a portion of an optical coupler, wherein the optical coupler provides a light transmission path from an optical fiber or a laser.

20. A method comprising:
    disposing a first waveguide over a first dielectric layer over a SOI substrate;
    disposing a second dielectric layer on the first waveguide and the first dielectric layer;
    etching the second dielectric layer, the first dielectric layer, and the SOI substrate to form an integrated trench structure in the SOI substrate;
    disposing a third dielectric layer in the integrated trench structure; and
    disposing a second waveguide on at least the third dielectric layer such that the second waveguide provides an optical coupling between the second waveguide and the first waveguide and such that a first distance between the first waveguide and a first portion of the SOI substrate is less than a second distance between the second waveguide and a bottom portion of the integrated trench structure.

* * * * *